April 19, 1927.
W. R. GARDNER
1,625,023
VEHICLE SPRING HANGER
Filed Jan. 2, 1926
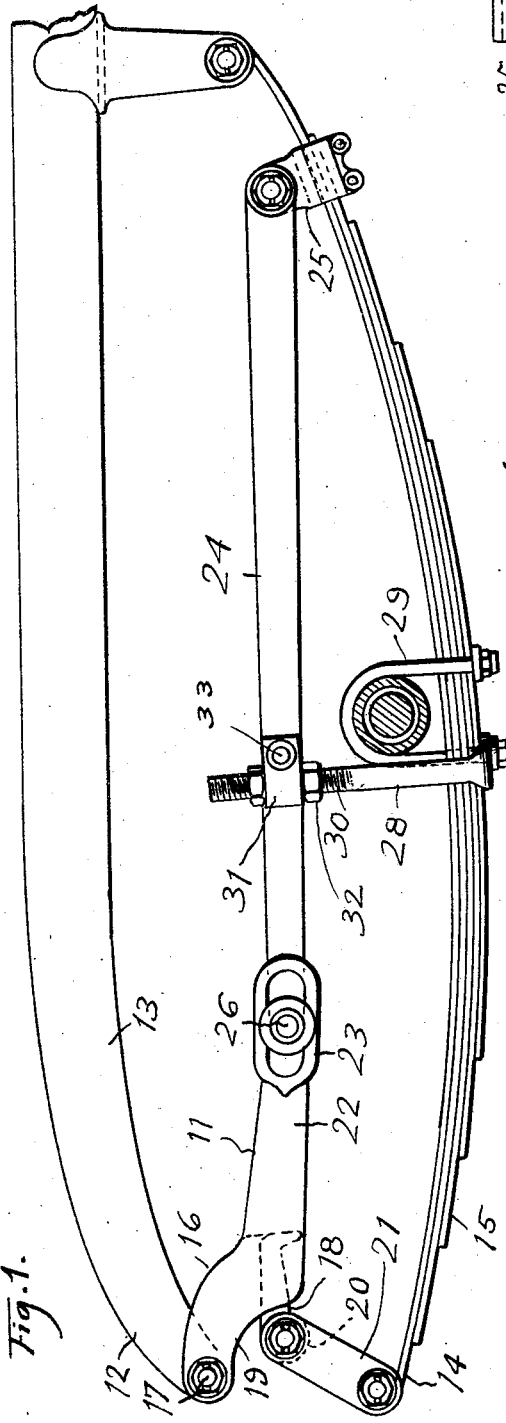
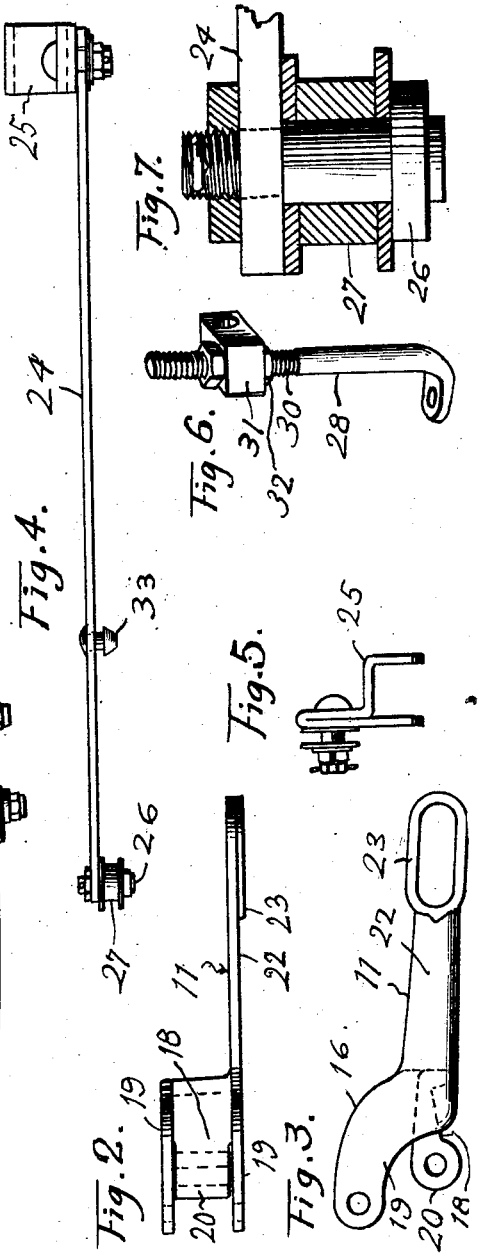
INVENTOR:
WILLIAM R. GARDNER.
BY ATTY:
Frederic M. Keeney.

Patented Apr. 19, 1927.

1,625,023

UNITED STATES PATENT OFFICE.

WILLIAM R. GARDNER, OF LOS ANGELES, CALIFORNIA, ASSIGNOR OF ONE-TENTH TO WALLACE B. TRUSLOW AND C. C. POST AND ONE-TENTH TO D. G. COLLINS, ALL OF LOS ANGELES, CALIFORNIA.

VEHICLE SPRING HANGER.

Application filed January 2, 1926. Serial No. 78,854.

The present invention relates to counterpoising mechanism adapted for use in hanging vehicle springs, and comprehends certain elements capable of absorbing the jars and vibrations ordinarily transmitted to the chassis by the ordinary vehicle springs. The device serves to hold the body of the vehicle in counterpoised position relative to the wheels and axle, whereby the jar incident to the vehicle wheels striking an obstruction will be cushioned and absorbed.

My invention includes a counterbalancing lever and other elements for suspension so arranged that the vehicle body, owing to its weight and inertia while the vehicle is in motion, will tend to advance in its normal path of movement, while the wheels and axle are sustaining vertical vibrations from obstructions and inequalities of the road, the device simultaneously snubbing the action of the springs and counterpoising the vehicle body.

With my combined lever and toggle mechanism as arranged in the present invention, the vehicle body and chassis will, if they have vertical movement at all, move in opposed relation to the movements of the wheels and axle, and this is effective in maintaining the vehicle springs practically at a constant tension, thereby minimizing fatigue and fracture of the springs. In addition to stabilizing the chassis and body, the arrangement permits the vibratory movement of the wheels and axle without lifting the body and chassis, thus avoiding much of the strain on wheels and axle such as occurs with the usual method of hanging the springs.

An advantage of the invention resides in the simplicity of the device, its inexpensive construction, the entire avoidance of springs in its construction, and the ease with which it may be applied to the standard type of vehicle for which it is designed, without changing the structural parts of the vehicle, or of the vehicle springs.

In my prior invention of vehicle spring counterpoise suspension, disclosed in application Serial Number 55,035, filed September 8, 1925, the vehicle axle tends to turn upon itself thereby causing a longitudinal vibration of the vehicle body, although checking vertical vibrations. To avoid this difficulty, the present invention provides an additional lever extending in opposed relation to the counterpoising lever, and connected to a vertically disposed bracket, the arrangement being such that the vehicle axle has a free vertical movement, but the tendency to turn upon itself is checked and avoided, and longitudinal vibratory movement of the vehicle body is eliminated as well as any vertical vibratory movement thereof.

The present invention contemplates the application of vertically disposed bracket elements affixed to the vehicle axle, and a lever connected to each bracket element whereby the counterpoising lever attains a greater radius of action for neutralizing the shocks and jars incident to the travel of the vehicle wheels over obstructions and inequalities of the road.

The present invention is an improvement over the device shown in my application for a patent, for motor vehicle spring shackle, filed May 12, 1925, Serial Number 29,722, in which the supporting lever was checked by a spring in its upward movement but was not checked in its downward movement. In the present invention this difficulty is avoided by providing an additional and opposed lever arranged to check both the upward and downward movements of the supporting lever.

The present invention has another advantage in that both forward and rear sections of each vehicle spring are utilized in maintaining the counterpoise of the vehicle body relative to the wheels and axle thus setting up a full floating action between the chassis and the vehicle axle.

By such construction it will be noted that the vehicle body and chassis will, through their weight and inertia, serve as a fulcrum, for the vehicle springs and for the counterpoise levers, and that the remaining shackle elements serve to transmit all vibratory movements of the wheels and axle to the opposed sections of the springs to be absorbed by the same, the arrangement provided serving to change the maximum vibratory movements of the wheels and axle to infinitesimal flexing movements of the vehicle springs, and the stability of the vehicle body remains comparatively undisturbed.

While the drawings exhibit an embodiment of the invention I have found the most desirable in actual use, I desire it understood that I reserve the privilege of resorting to all the mechanical changes to which the device is susceptible, the invention being defined and limited only by the terms of the appended claims.

In the drawings, Figure 1 is a side elevation showing a fragment of a vehicle chassis, a rear vehicle spring, and my improved counterpoise shackle suspension applied thereto. Fig. 2 is a top plan view of the counterpoising lever. Fig. 3 is a side view of the counterpoising lever. Fig. 4 is a top plan view of the equalizing lever which limits the action of the counterpoising lever. Fig. 5 is a front view of a clip for securing the equalizing lever to a vehicle spring. Fig. 6 is a perspective detail view of a supporting bracket adapted to be secured to the vehicle axle and having pivotal connection with an equalizing lever. Fig. 7 is a fragmentary and sectional detail view showing the roller on the end of an equalizing lever and adapted to engage with a corresponding slotted end in a counterpoising lever.

In the application of the device, each vehicle spring may be provided with my improved counterpoise suspension, the forms, sizes, and location of the elements being modified in accordance with the dimensions and character of each vehicle spring.

Assuming the invention to be embodied in the form illustrated, the elements referred to embody a counterpoise lever 11, interposed between the rear extremity 12 of the chassis bar 13 and the rear eye-end 14, of vehicle spring 15. Lever 11 has a bifurcated end 16, pivotally connected by bolt 17, to the end 12, of the chassis bar. The web portion 18, between arms 19, of the bifurcated end 16, is provided with an eye-end 20, pivotally connected to vehicle shackle link 21, the relatively long arm 22, of lever 11, having a slotted extremity 23. An equalizing lever 24 is pivotally connected to a supporting member 25, which serves as a clip for retaining the position of the leaves of vehicle spring 15. Lever 24 is provided with a fixed bolt or bearing member 26, on which is mounted a roller 27, adapted to work in the slotted extremity 23, of counterpoise lever 11. A supporting bracket 28 is fixed to the vehicle axle, being secured by the vehicle saddle bolt 29. The bracket 28 has a threaded end 30, on which is mounted a slidable sleeve 31, secured by lock or jam nuts 32. Sleeve 31 is pivotally connected to a bearing member 33, projecting from lever 24.

What is claimed is:

1. The combination with a counterpoise lever having a relatively short arm connected to the automobile chassis, of a shackle link pivotally connected to the counterpoise lever adjacent to its connection with the chassis and having its opposite end pivotally connected to the eye-end of the vehicle spring, a relatively long arm on the counterpoise lever extending above the vehicle spring, a bracket extending upwardly from the vehicle axle, an equalizing lever pivotally connected relative to the bracket and having a relatively short arm and a relatively long arm, and means for connecting the long arm to the vehicle spring, and the short arm of the equalizing lever to the long arm of the counterpoise lever.

2. The combination with an automobile chassis having an eye-end, and a vehicle spring having an eye-end adjacent to the eye-end of the chassis, its central portion fixed to the vehicle axle, and its opposite end pivotally connected to the chassis, of a rigid bracket fixed to the vehicle axle, and extending upwardly, a counterpoise lever having a pivotal connection with the eye-end of the chassis, and having its free end extending between the vehicle spring and the chassis, an equalizing lever connected to the bracket extremity and its extremities connected, respectively, to the arm of the counterpoise lever between the spring and chassis, and to the vehicle spring adjacent to its connection to the chassis, and a shackle link connected to the counterpoise lever intermediate of its ends, and connected to the free eye-end of the vehicle spring.

3. In a counterpoise spring suspension for vehicle springs, the combination with the vehicle chassis bar having an eye-end, and a vehicle spring having an eye-end adjacent to the eye-end of the chassis bar, and having its opposite eye-end connected to the chassis bar and its central portion connected to the vehicle axle, of a counterpoise lever having a relatively short arm and a relatively long arm and its fulcrum at the junction of said arms, and having its short arm pivotally connected to the eye-end of the chassis bar, and its long arm extending between the vehicle spring and chassis bar, shackle links connected to the counterpoise lever at its fulcrum point, and connected to the vehicle spring, an equalizing member connected to the vehicle spring adjacent to its opposite end and connected to said long arm of the counterpoise lever to limit the movement thereof, and a supporting member extending upwardly from the axle and supporting the equalizing member between its extremities.

4. In a counterpoise spring suspension for vehicles, the combination with a vehicle chassis bar and a vehicle spring extending beneath the chassis bar, of a bracket fixed to the axle and extending upwardly therefrom, shackle links extending upwardly from the end of the vehicle spring, a counterpoise lever supported by said shackle links and having one end connected to the end of the chassis bar, said lever and link arrangement causing a forward thrust of the counterpoising lever on the upward movement of the vehicle axle, an equalizing lever pivotally connected relative to the upwardly extending bracket and having one end connected to the forward portion of the vehicle spring, and a roller mounted on the opposite end of the equalizating lever and working in a corresponding slot in the end of the counterpoising lever.

5. In a counterpoise spring suspension for vehicles, the combination with a vehicle chassis bar and a vehicle spring extending beneath the chassis bar, and the vehicle axle, of a bracket fixed to the axle and extending upwardly therefrom and terminating intermediate the chassis bar and axle, and serving to shift the vibratory movement of the axle to said intermediate point, a counterpoise lever having opposed lever arms, one serving as a weight arm and the other as a power arm, and having an intermediate fulcrum point at the junction of said arms and having the weight arm pivotally connected to the end of the chassis bar, a shackle link connected at one end to the said fulcrum point of the counterpoise lever, and having its opposite end connected to the eye-end of the vehicle spring, whereby said fulcrum point is beyond a plane passing through the ends of chassis bar and vehicle spring, a clip mounted on the opposite and forward end of the vehicle spring, an equalizing lever having one end povitally connected to the clip, a roller on the opposite end of the equalizing lever and working in a corresponding slot in the free power arm of the counterpoise lever, and a pivotal connection between the bracket and an intermediate point on the equalizing lever.

6. In a counterpoise spring suspension for vehicles, the combination with the vehicle axle, vehicle spring, and vehicle chassis bar, of a bracket fixed to the axle and extending upwardly therefrom, a counterpoise lever having one end pivotally connected to the chassis bar and extending in the plane of the chassis bar and vehicle spring, and adapted for vertical oscillating movement between the spring and chassis bar, a link connected to the counterpoise lever and connected to the free end of the vehicle spring, an equalizing lever pivotally connected relative to the bracket, a clip member fixed to the opposite end of the vehicle spring and having a pivotal connection with the equalizing lever, and a roller and slot connection between the free ends of the counterpoise lever and equalizing lever.

7. In a counterpoise spring suspension for vehicles, a vehicle spring extending from the axle of the vehicle, a chassis bar above the spring, a bracket extending upwardly from the axle and terminating between the chassis bar and axle, said bracket serving to transmit the vibratory movements of the axle to an intermediate point between the spring and chassis bar, an equalizing lever having one end connected to the forward end of the vehicle spring, and being connected pivotally relative to the bracket at an intermediate point on the equalizing lever, a counterpoise lever pivotally connected to the eye-end of the chassis bar, shackle links connected to an intermediate point on the counterpoise lever, and to the free end of the vehicle spring, and a working connection between the free end of the counterpoise lever and the free end of the equalizing lever.

8. In a counterpoise spring suspension for vehicles, the combination with a chassis bar and a vehicle spring extending beneath the chassis bar, and a vehicle axle, said spring and chassis bar each having an eye-end, of a bracket fixed to the axle and extending upwardly therefrom, pivotal connection elements mounted on the bracket, means for adjusting the pivotal connecting elements vertically on the bracket, a two-armed counterpoise lever having a medial fulcrum point and a relatively short weight arm and a relatively long power arm, a pivotal connection between the weight arm and the eye-end of the chassis bar, a shackle link pivotally connected to the counterpoise lever and its fulcrum point, and pivotally connected to the eye-end of the vehicle spring, said fulcrum point being off-set relative to a plane passing through the eye-ends of the chassis bar and spring, an equalizing lever mounted on the pivotal connecting elements on the bracket, a clip secured to the vehicle spring adjacent to its forward end, a pivotal connection between the equalizing lever and clip, and a slidable connection between the power arm of the counterpoise lever and the free end of the equalizing lever.

In testimony whereof, I hereunto affix my signature.

WILLIAM R. GARDNER.